US011939910B2

(12) United States Patent
Jochman

(10) Patent No.: US 11,939,910 B2
(45) Date of Patent: Mar. 26, 2024

(54) BELT DRIVE SYSTEM HAVING AN INTERMEDIATE GENERATOR AND ASSOCIATED METHOD

(71) Applicant: Illinois Tool Works Inc., Glenview, IL (US)

(72) Inventor: Nathan Joe Jochman, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/996,192

(22) Filed: Aug. 18, 2020

(65) Prior Publication Data

US 2022/0056840 A1 Feb. 24, 2022

(51) Int. Cl.
*B60K 6/42* (2007.10)
*F02B 67/06* (2006.01)
*F16H 55/36* (2006.01)

(52) U.S. Cl.
CPC ............. *F02B 67/06* (2013.01); *F16H 55/36* (2013.01); *F02B 2275/06* (2013.01)

(58) Field of Classification Search
CPC ...... F02B 2275/06; F02B 67/06; F02B 67/04; F02B 63/044; F02B 63/048; F02B 63/047; F02B 2063/046; F02B 2063/045; F16H 55/36; F02N 11/04; F02N 11/003; F02N 11/00

See application file for complete search history.

(56) References Cited

U.S. PATENT DOCUMENTS

| 7,727,115 | B2 * | 6/2010 | Serkh | B60K 6/48 475/210 |
| 2009/0255741 | A1 * | 10/2009 | Major | B60K 6/48 474/84 |
| 2009/0298646 | A1 * | 12/2009 | Parsons | F16D 41/07 474/171 |
| 2010/0199655 | A1 * | 8/2010 | Renner | F04B 17/05 60/431 |
| 2010/0301672 | A1 * | 12/2010 | Di Cristofaro | H02B 7/06 307/39 |

(Continued)

FOREIGN PATENT DOCUMENTS

| CN | 103477119 A | * | 12/2013 | ............. B60K 25/02 |
| DE | 102010054630 A1 | * | 6/2012 | ............. B60K 25/02 |

(Continued)

*Primary Examiner* — George C Jin
*Assistant Examiner* — Teuta B Holbrook
(74) *Attorney, Agent, or Firm* — McAndrews, Held & Malloy, Ltd.

(57) ABSTRACT

Described is a power system having an engine, a generator, a belt-driven component, a first pulley, a second pulley, a third pulley, and a fourth pulley. The engine outputs a rotational force at a first rotational speed to rotate the first pulley. The generator converts mechanical power driving the generator shaft to electric power. The second pulley is drivingly coupled to the first pulley via a first belt and configured to rotate the generator shaft at a second rotational speed based on the first rotational speed. The fourth pulley coupled to the generator shaft having a first diameter that is greater than a second diameter of the second pulley. The fourth pulley configured to drive the third pulley at a third rotational speed to drive the belt-driven component

21 Claims, 5 Drawing Sheets

(56) References Cited

U.S. PATENT DOCUMENTS

2019/0001805 A1* 1/2019 Colavincenzo ....... B60W 20/15
2019/0376483 A1* 12/2019 Khafagy ................. F02N 15/06

FOREIGN PATENT DOCUMENTS

| DE | 102012214200 A1 * | 2/2014 | ........... B60H 1/3222 |
| DE | 102015223976 A1 * | 6/2016 | ............... B60H 1/32 |
| DE | 202016101757 U1 * | 6/2016 | ............ B60K 6/485 |
| DE | 102017105261 A1 * | 9/2018 | |
| DE | 102018126459 B3 * | 3/2020 | |
| FR | 3035355 A1 * | 10/2016 | ........... B60H 1/3222 |
| KR | 20180068495 A * | 6/2018 | |
| WO | WO-2015041330 A1 * | 3/2015 | ............... B60K 6/24 |

* cited by examiner

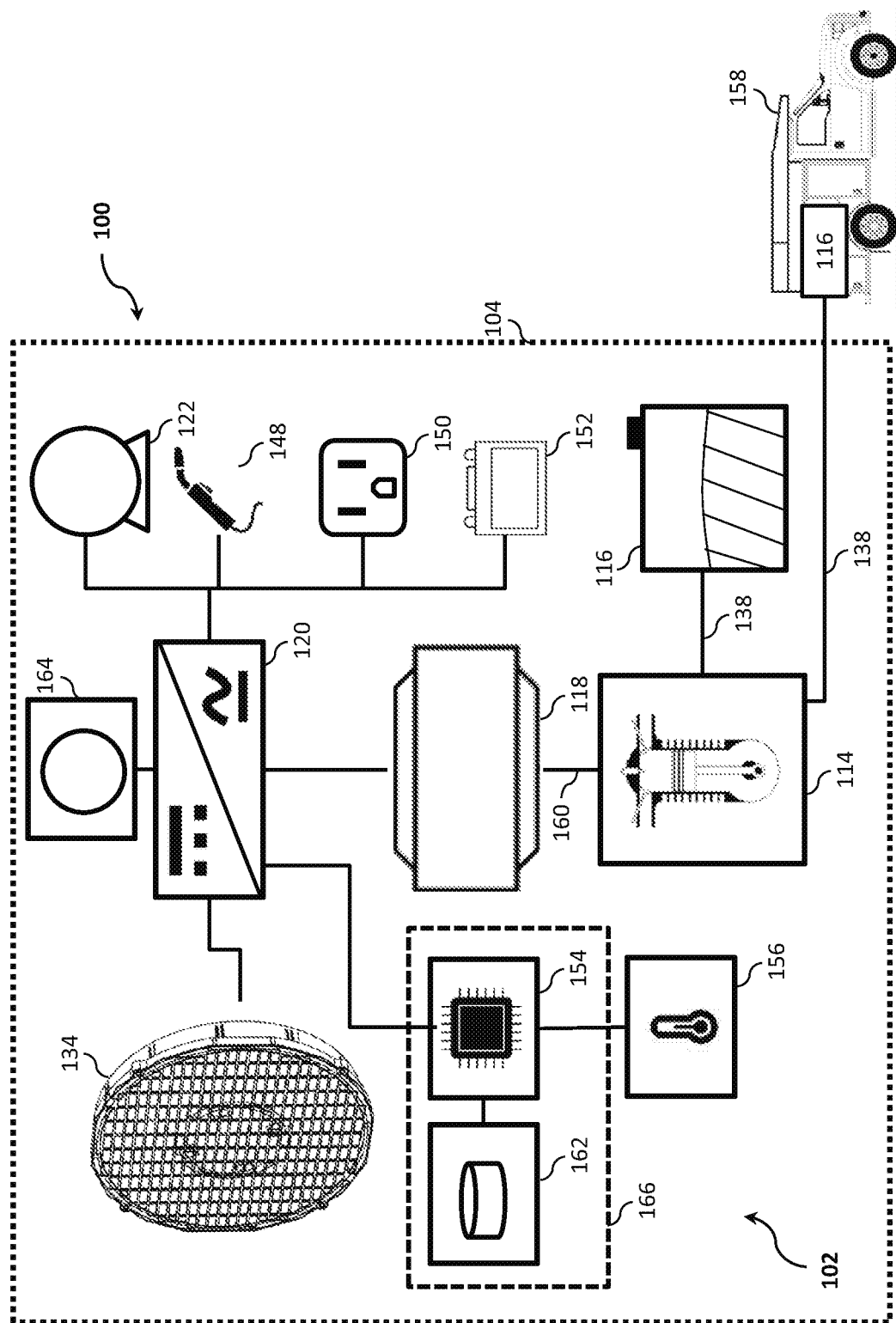

BELT DRIVE SYSTEM HAVING AN INTERMEDIATE GENERATOR AND ASSOCIATED METHOD

FIELD

The present disclosure is directed to engine-driven power systems and, more particularly, to power systems with a generator serving as an intermediate speed component of drive system.

BACKGROUND

Conventionally, engine-driven power systems include an engine configured to operate various driven components, such a generators, air compressors, and the like. Sometimes it is desirable to adjust the rotational speed from the engine to meet the rotational speed needs of the various driven components via a belt system. For example, a generator and an air compressor may operate at different rotational speeds. While existing belt systems can adjust the rotational speed, it is desirable to adjust the rotational speed in engine-driven power systems more economically and efficiently, while also reducing complexity and noise.

SUMMARY

Power systems configured to operate at a non-synchronous speed are disclosed, substantially as illustrated by and described in connection with at least one of the figures.

According to a first aspect, a power system comprises: a first pulley; an engine configured to output a rotational force at a first rotational speed to rotate the first pulley; a generator comprising a generator shaft and configured to convert mechanical power driving the generator shaft to electric power; a belt-driven component; a second pulley drivingly coupled to the first pulley via a first belt and configured to rotate the generator shaft at a second rotational speed based on the first rotational speed; a third pulley configured to drive the belt-driven component; and a fourth pulley coupled to the generator shaft having a first diameter that is greater than a second diameter of the second pulley, and configured to drive the third pulley at a third rotational speed via a second belt based on rotation of the generator shaft by the second pulley.

In certain aspects, the fourth pulley comprises a clutch mechanism.

In certain aspects, the belt-driven component is an air compressor configured to output pneumatic power.

In certain aspects, the second rotational speed is greater than the first rotational speed.

In certain aspects, the third rotational speed is greater than the second rotational speed.

In certain aspects, the first rotational speed is between 1,800 revolutions per minute (RPM) and 3,200 RPM.

In certain aspects, the second rotational speed is between 3,200 RPM and 4,000 RPM.

In certain aspects, the third rotational speed is between 4,000 RPM and 10,000 RPM.

In certain aspects, the power system further comprises a welding-type power supply that is configured to receive electric power from the generator.

In certain aspects, the second pulley and the fourth pulley share an axis of rotation.

In certain aspects, the third pulley has a third diameter that is less than the first diameter.

According to a second aspect, a method for operating a power system comprises: outputting, via an engine, a rotational force to a drive system at a first rotational speed; converting the rotational force from the first rotational speed to a second rotational speed that is greater than the first rotational speed via the drive system, wherein the drive system comprises a first pulley and a second pulley that are drivingly coupled to one another such that the first pulley drives the second pulley at a fixed pulley ratio; and receiving, at a generator configured to generate electric power, the rotational force at the second rotational speed, wherein the generator is coupled to the second pulley; wherein the generator is coupled to the second pulley via a generator shaft and configured to receive the rotational force at the second rotational speed, wherein the generator comprises a third pulley coupled to the generator shaft that shares an axis of rotation with the second pulley, and wherein the third pulley has a first diameter that is greater than a second diameter of the second pulley; and driving a belt-driven component at a third rotational speed via a fourth pulley, wherein the third pulley and the fourth pulley are drivingly coupled to one another via a second belt.

In certain aspects, the belt-driven component is an air compressor, the method further comprising the step of outputting pneumatic power.

In certain aspects, the second rotational speed is greater than the first rotational speed.

In certain aspects, the third rotational speed is greater than the second rotational speed.

In certain aspects, the first rotational speed is between 1,800 revolutions per minute (RPM) and 3,200 RPM.

In certain aspects, the second rotational speed is between 3,200 RPM and 4,000 RPM.

In certain aspects, the third rotational speed is between 4,000 RPM and 10,000 RPM.

According to a third aspect, a generator for an engine-driven power system comprises: a generator shaft configured to rotate a rotor that is arranged to rotate relative to a stator; a driven pulley coupled to the generator shaft, wherein the driven pulley is configured to receive a rotational force at a first rotational speed via a first belt; and a driving generator pulley coupled to the generator shaft, wherein the driving generator pulley comprises a clutch mechanism and has a first diameter that is greater than a second diameter of the driven pulley, and wherein the driven pulley is configured to transfer the rotational force to a belt-driven component via a second belt to drive the belt-driven component at a second rotational speed; and a belt-driven pulley coupled to the belt-driven component, wherein the belt-driven component is configured to receive the rotational force at a third rotational speed, and wherein the driving generator pulley and the belt-driven pulley are drivingly coupled to one another via a second belt.

In certain aspects, the second rotational speed is greater than the first rotational speed.

In certain aspects, the first rotational speed is between 3,200 RPM and 4,000 RPM.

In certain aspects, the belt-driven component is an air compressor.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 1c illustrates a schematic diagram of the example power system.

DETAILED DESCRIPTION

Figure 1A:
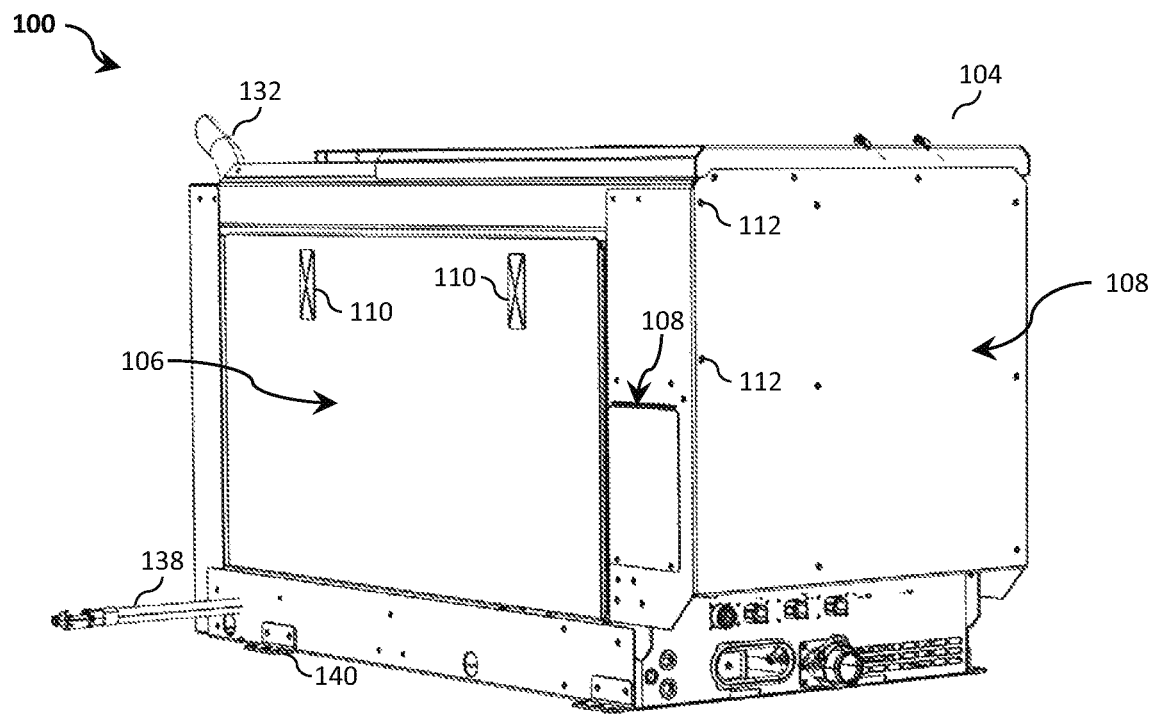
FIG. 1a illustrates a perspective view of an example power system having a power unit arranged within an enclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

As used herein, the terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

As used herein, the term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, the terms "drivingly coupled," "drivingly coupled to," and "drivingly coupled with" as used herein, each mean a mechanical connection that enables a driving part, device, apparatus, or component to transfer a mechanical force to a driven part, device, apparatus, or component.

As used herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

As used herein, "power conversion circuitry" refers to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

Power systems, such as engine-driven units and other equipment, are sometimes permanently mounted to a work truck body in one or more mounting locations. Example power systems that have enclosures include engine-driven generators, welders, air compressors, and combinations thereof (e.g., a multi-use engine driven power units, such as the EnPak® power system available from Miller Electric Mfg. LLC). The mounting locations of a work truck body typically include, for example, the side on top of the tool box, the load space behind the cab (e.g., in-between the toolboxes), and/or under the deck of the body (e.g., in front of the rear axle).

Figure 1B:
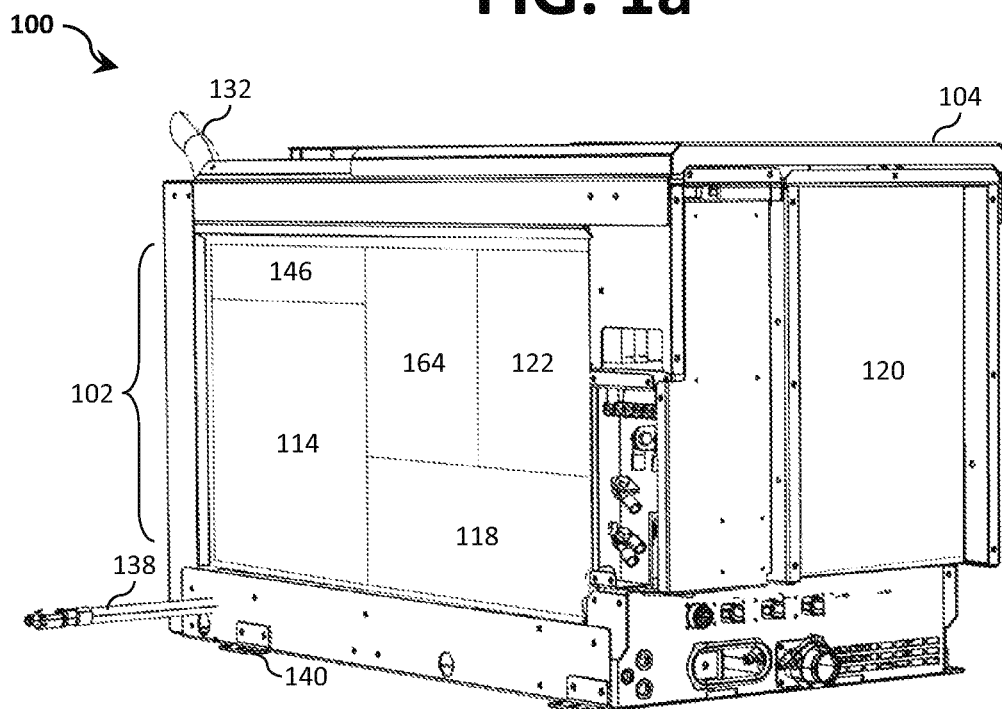
FIG. 1b illustrates a perspective view of the example power system with portions of the enclosure removed to better illustrate the power unit.

FIGS. 1a and 1b illustrate perspective views of an example power system 100. Specifically, FIG. 1a illustrates the example power system 100 with its enclosure 104 assembled, while FIG. 1b illustrates the example power system 100 with selected panels of the enclosure 104 removed. The example power system 100 includes a power unit 102 arranged within an enclosure 104. The enclosure 104 is primarily constructed with sheet metal, and may include multiple panels.

Service access to the power unit 102 can be provided by a removable panel (e.g., by fasteners), a door (e.g., via a hinged panel), a void in the enclosure, or by any other suitable method or design. Therefore, one or more of the panels or portions of the enclosure 104 may be removable and/or otherwise open to permit service access to the power unit 102. For example, a primary removable access panel 106 may be secured to a lateral side of the enclosure 104 via one or more latches 110 that can span the entire length of the enclosure 104 to facilitate convenient, single-side service access to the components of the power unit 102 located within interior of the enclosure 104. In some examples, the removable access panel 106 may be hingedly coupled to the enclosure 104.

In addition to the removable access panel 106, one or more secondary removable access panels 108 may be secured to the enclosure 104 via using mechanical fasteners 112, such as screws, bolts, clips, snaps, etc. In either case, as best illustrated in FIG. 1b, the primary and secondary removable access panels 106, 108 may be provided at the top side, bottom side, first lateral side, second lateral side, rear side, and/or front side of the enclosure 104 to facilitate access to and maintenance of the power unit 102 or portions thereof. Relative terms (e.g., front/rear, etc.) are used to aid in the reader's understanding of the enclosure's configuration. Although relative terms are used to describe the various surfaces and sides of the enclosure 104, any side can be considered a top/bottom/front/rear/first side/second side, depending on a particular design of the power system 100, the installation configuration, and/or perspective of the viewer.

The arrangements of the power unit 102 can be more easily understood from FIG. 1c, which illustrates the components of an engine-driven power system. As illustrated, the power system 100 includes an engine 114 and a generator 118, where the engine 114 is configured to drive a generator 118 to generate electrical power. Specifically, FIG. 1c illustrates a schematic diagram of the power system 100. As illustrated, the example power system 100 may comprise the engine 114, one or more fuel tanks 116, a generator 118, power conversion circuitry 120, an air compressor 122 configured to output pneumatic power, a welding-type power supply 148 configured to output welding-type power (e.g., an inverter-based welder), one or more power outlets 150, a battery charger 152, one or more fan assemblies 134, a processor 154, a memory device 162, one or more sensors 156, and/or a hydraulic pump 164 configured to output hydraulic power. The example hydraulic pump 164 and the air compressor 122 may be powered by mechanical power from the engine 114 and/or by electrical power from the generator 118. The example power system 100 may further or alternatively include other components not specifically discussed herein.

The engine 114 receives fuel from one of the one or more fuel tanks 116 via one or more fuel lines 138. The engine 114 may be a diesel or gasoline engine configured to output, for example, between 20 and 50 horse power. In one example, the engine 114 may be a small inline diesel engine. The engine 114 is controllable to operate at multiple speeds, such as an idle (e.g., no or minimal load speed) and a maximum speed (e.g., the maximum rated power of the engine 114). The engine speed may be increased and/or decreased based on the load. The engine 114 is operatively coupled with a muffler 146, which may be configured to output exhaust from the engine 114 via an exhaust pipe 132.

The fuel tank 116 may be located within the enclosure 104 or external to the enclosure 104. For example, the engine 114 may draw fuel from a fuel tank 116 that is external to the enclosure 104 via fuel line 138, such as a fuel tank 116 of the vehicle 158 (e.g., a work truck) to which the power system 100 is mounted (e.g., via mount brackets 140). The engine 114 is mechanically coupled or linked to a generator shaft of the generator 118. For example, the engine 114 is configured to output a rotational force either directly or via a driveshaft 160.

The generator 118 generates output power based on the mechanical input from the engine 114. Specifically, the generator 118 is configured to generate electric power using the rotational force from the engine 114. The generator 118 supplies the electrical power to the power conversion circuitry 120. In some examples, the generator 118 is implemented using a high-output alternator. Collectively, the engine 114 and the generator 118 provide mechanical power and/or electrical power to power subsystems.

The power conversion circuitry 120 provides one or more types of electrical power suitable for specific and/or general purpose uses. The example power conversion circuitry 120 may include one or more power subsystems, such as the welding-type power supply 148, an auxiliary power supply configured to output AC power (e.g., 120 VAC, 240 VAC, 50 Hz, 60 Hz, etc.) and/or DC power (e.g., 12 VDC, 24 VDC, battery charging power, etc.) to the power outlets 150, and/or a vehicle power subsystem configured to convert electrical power to at least one of AC power or DC power to power or charge at least one component of a vehicle (e.g., battery charger 152), such as the vehicle 158 on which the power system 100 is mounted. The welding-type power supply 148 converts output power from the generator 118 to welding-type power based on a commanded welding-type output. The welding-type power supply 148 provides current at a desired voltage (e.g., from a user interface) to an electrode and a workpiece to perform a welding-type operation.

The power conversion circuitry 120 may include, for example, a switched mode power supply or an inverter fed from an intermediate voltage bus. Power conditioning circuitry may include a direct connection from a power circuit to the output (such as to the weld studs), and/or an indirect connection through power processing circuitry such as filters, converters, transformers, rectifiers, etc. For example, the power conversion circuitry 120 may convert, invert, or otherwise process power from the generator 118 to output an operating power to the air compressor 122 (e.g., where an electric air compressor is used), a welding power to the welding-type power supply 148, 110 VAC and/or 220 VAC power to a power outlet 150, a battery charging power to a battery charger 152 (e.g., via battery clamps), and/or any other type of electrical power. In other examples, such as the configuration illustrated in FIG. 2a, the air compressor 122 may be driven by the engine 114 via a drive system 202 having one more belts and/or pulleys. In this example, the air compressor 122 may be a rotary screw air compressor. For example, the generator 118 may include a clutch for transmission of rotational force from the engine 114 to the air compressor 122 via the one more belts and/or pulleys.

While illustrated as separate blocks, the power conversion circuitry 120 may be integrated, or otherwise share circuitry, with other components, such as the welding-type power supply 148. For example, the power conversion circuitry 120 may be configured to provide a welding current directly to a welding torch without requiring additional circuitry or power processing.

The control circuitry 166 employs a processor 154 is operatively coupled with a memory device 162 (e.g., read-only memory (ROM), random access memory (RAM), etc.)

configured to monitor and/or control the various functions and statuses of the power system 100. For example, one or more operations of the power system 100 may be controlled by the processor 154 in accordance with instructions (e.g., software algorithms) stored to a memory device 162 and/or based on an operational status of the of the power system 100.

The one or more fan assemblies 134 are configured to urge cooling air through the enclosure 104 to cool one or more components of the power unit 102. While the fan assembly 134 is the primary driver of the air through the enclosure, in some examples, other components of the power system 100 may employ dedicated fans. For example, the generator 118 may include a small generator fan to specifically cool the generator windings. Like the fan assembly 134, the generator fan moves air to an air outlet location. The generator fan can be significantly smaller than the fan assembly 134 and is not the primary driver of the air flow, because the generator fan is sized to cool only the generator 118.

The one or more sensors 156 (e.g., temperature sensor, humidity sensor, voltage sensors, current sensors etc.) may be located throughout the power unit 102 and configured to monitor one or more conditions of the power unit 102 or environment surrounding the power unit 102.

The engine 114 in an engine-driven generator, such as the power system 100, may be operated at one or more desired speeds. In the case of a small diesel engine, the engine 114 may be operated at a speed between 1,800 and 4,000 revolutions per minute (RPM), where a high speed operation is generally about 3,600 RPM and a low speed operation is generally about 1,800 RPM. In one example, the engine 114 may be operated at 3,600 RPM to achieve high power in a small and light product package. In one example, the generator 118 may be a 2-pole generator configured to operate at 3,600 RPM (for full power). In this example, the generator 118 can be directly connected to the flywheel side of the engine 114 because the engine 114 and the generator 118 are synchronous relative to one another (i.e., they each operate at the same speed, for example, 3,600 RPM). A high speed operation (e.g., 3,600 RPM), however, results in increased noise and vibration compared a low speed operation. Driving the generator 118 configured for 3,600 RPM at a low speed operation (e.g., 1,800 RPM) may not provide adequate power. In order to produce a power system 100 where a lower speed engine 114 can be used, the drive system 202 may be configured to convert the lower non-synchronous speed from the engine 114 to a higher speed needed for the generator 118 (e.g., 3,600 RPM) and/or other belt-driven components (e.g., greater than 4,000 RPM).

Figure 2A:
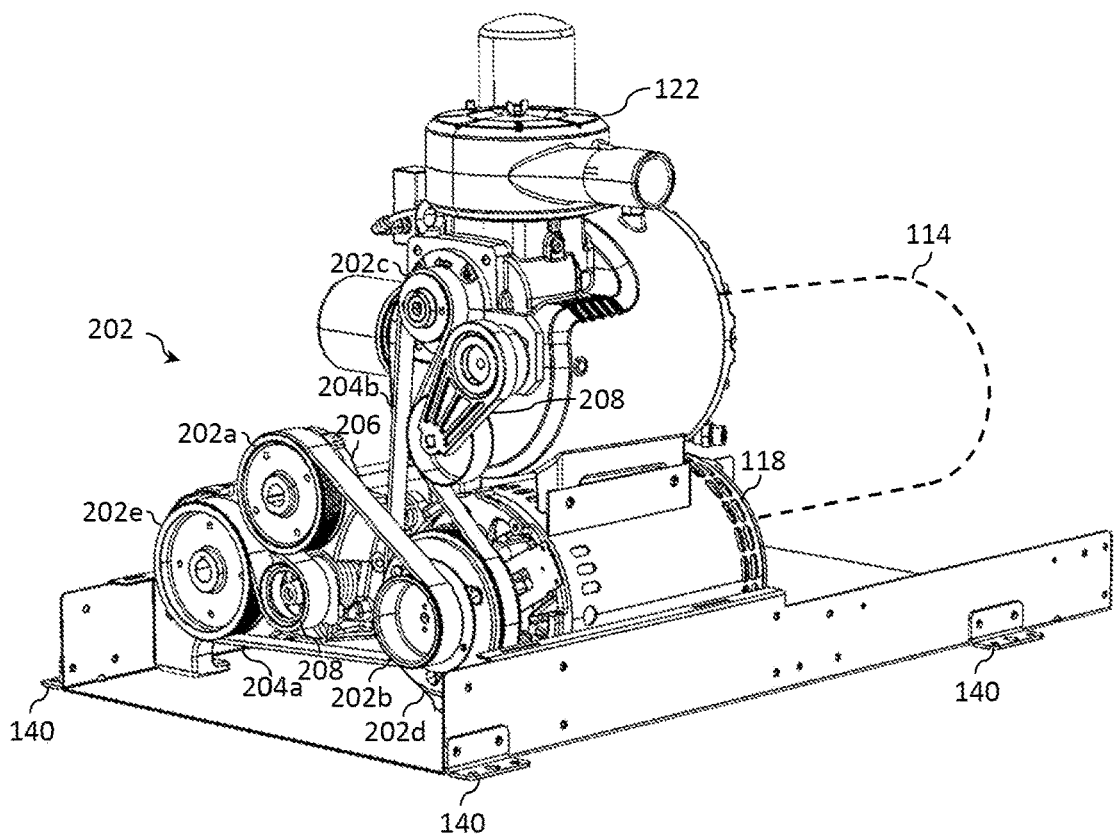
FIGS. 2a and 2b illustrate perspective views of the drive system of the example power system.
Figure 2B:
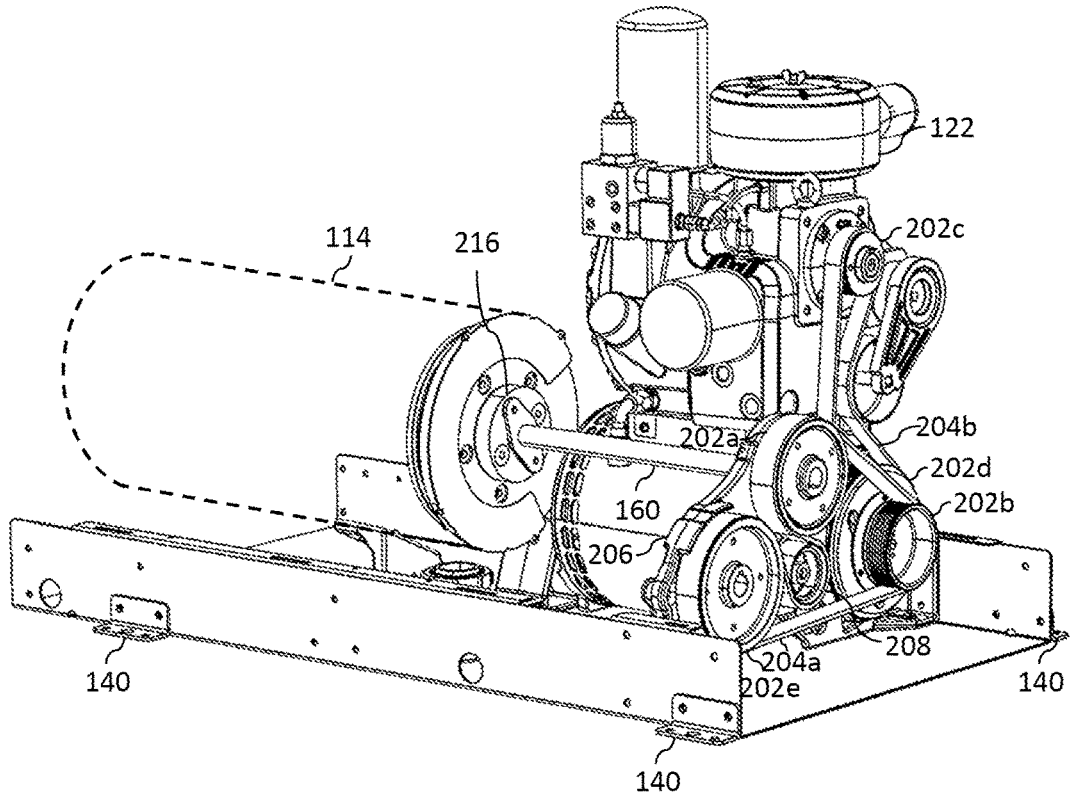

FIGS. 2a and 2b illustrate perspective views of the example power system 100 with components removed to better illustrate the driveshaft 160, the drive system 202, the generator 118, and the air compressor 122. The engine 114 (illustrated in broken lines) is drivingly coupled to the drive system 202. In one example, the engine 114 is configured to output a rotational force to the drive system 202 via the driveshaft 160. The driveshaft 160 may be coupled to the engine 114 via a coupler 216. The drive system 202 involves a set of multiple pulleys that are drivingly coupled to one another via one or more belts 204a, 204b at a fixed pulley ratio.

When a single belt is used to drive all of the components, the speeds of the components should be relatively similar to avoid very large or very small pulley diameters. A problem with this approach is that some belt-driven components, such as the air compressor 122, have a high operating speed compared to common driven components. For example, the air compressor 122 may be a rotary screw type air compressor that provides continuous air output while maintain a small and quiet package. Rotary screw air compressors, however, operate at relatively high speeds (e.g., 4,000 to 10,000 RPM), whereas engines used to operate these air compressors 122 in mobile power system 100 operate at much lower speeds (e.g., 1,800 to 4,000 RPM, often around 3,600 RPM). Therefore, a large speed ratio is needed between the engine 114 and air compressor 122.

This speed ratio is often too large to achieve using a single belt, which is further complicated when a pulley comprises an integrated clutch. For example, the clutch would either have to be very large or very small on the belt pulley diameter, which is difficult to achieve efficiently. Other approaches to managing the large speed ratio include providing an undersized belt-driven pulley 202c at the air compressor 122 to drive the air compressor 122, adding gears to the compressor assembly, and/or adding a jackshaft with two differently sized, concentric pulleys.

The jackshaft can include a clutch that is placed on the jackshaft as the larger of the two pulleys on the shaft. In operation, the jackshaft spins at an intermediate speed to provide a step-up in speed (e.g., as an intermediate). For example, the engine 114 may be operating at 3,600 RPM with a belt ratio (e.g., via the drive system 202) to get the jackshaft to 6,000 RPM and from the jackshaft to the compressor at 10,000 RPM (via the two different pulleys of the jackshaft). When a clutch is used on the jackshaft, the clutch typically has a straight bore and the smaller drive pulley also a straight bore, both with keys and set crews for attachment. Other approaches use a split taper bushing for the clutch and a second split taper bushing for the smaller drive pulley, again with a keyed shaft. One complication with these approaches, in addition to increasing the cost and the number of components, is that a keyed shaft is used, which can be difficult to align with other pulleys/components. A keyed shaft design can also be difficult to assemble and/or disassemble in the field when a repair is needed. For example, the power system 100 may need to be serviced to replace one or more parts in the field, which would warrant easy assembly and/or disassembly.

To address these complications, the generator 114 may include a generator shaft 210 that supports a driven generator pulley 202b and a driving generator pulley 202d. In this arrangement, the generator shaft 210 functions as an intermediate speed component of a drive system 202. The drive system 202 allows the engine 114 to drive the generator 118 and other belt-driven components at full power and at a non-synchronous speed, while also reducing noise and dampening vibration.

By setting the pulley ratio(s) of the drive system 202, the engine 114 can operate at a first rotational speed and drive the generator 118 at a second rotational speed and the air compressor 122 at a third rotational speed. The third rotational speed may be greater than the second rotational speed, which, in turn, is greater than the first rotational speed. For example, the first rotational speed may be between 1,800 revolutions per minute (RPM) and 3,200 RPM, the second rotational speed may be between 3,200 RPM and 4,000 RPM, and the third rotational speed may be between 4,000 RPM and 10,000 RPM.

The drive system 202 may comprise a drive pulley 202a, a driven generator pulley 202b, a belt-driven pulley 202c, a driving generator pulley 202d, one or more idler pulleys 202e, and/or one or more tensioners 208 drivingly coupled to one other via one or more belts 204a, 204b. The driven generator pulley 202b and the driving generator pulley 202d may have two different pulley sizes (e.g., pulley diameters) to reduce size, cost, and complexity by obviating the need for an undersized belt-driven pulley 202c, additional gears, and/or the jackshaft. The driving generator pulley 202d may further comprise an integrated clutch. Integrating the driven generator pulley 202b, the driving generator pulley 202d, and/or clutch with the generator 118 reduces the number of drive components and thus creates a smaller drive system package for the power system 100. This arrangement has improved strength, assembly, disassembly, and alignment when compared to other designs.

In some examples, a tensioner 208 is included to providing flexibility for the one or more of the drive belts (e.g. belt 204b). Two or more the pulleys of the drive system 202 may be fixed relative to each other via a bracket 206. Fixing two or more pulleys relative to each other reduces relative motion and reduces drive belt wear and/or derailment (e.g., jumping off a pulley). For example, as illustrated, the bracket 206 provides a structure for the drive pulley 202a, the idler pulley 202e, and tensioner 208. The one or more belts 204a,204b may be fabricated from a vibration-dampening materials to dampen transfer of vibrations (and noise) through the drive system 202 and/or between the drive system 202, the generator 118, and the air compressor 122.

As illustrated, the drive pulley 202a and the driven generator pulley 202b are drivingly coupled to one another via one or more belts 204a, 204b and/or one or more intermediate pulleys (e.g., idler pulley 202e). For example, the power system 100 may also include an idler pulley 202e and a tensioner 208, wherein the first belt 204a links the generator clutch (e.g., via driven generator pulley 202b), the belt-driven pulley 202c (e.g., air compressor pulley), the idler pulley 202e, and the tensioner 208. In some examples, the engine 114 is configured to drive the first belt 204a, such that the idler pulley 202e and the tensioner 208 are driven in a first rotational direction and the driven generator pulley 202b is driven in a second rotational direction opposite the first rotational direction. In examples, the one or more belts 204a, 204b are driven in a tortuous path around the generator clutch, the belt-driven pulley 202c of the air compressor 122, the idler pulley 202e, and the tensioner 208.

The fixed pulley ratio may be achieved by using pulleys of different diameter sizes to step up (or down, if desired) the rotational speed, RPM. For example, to step up the rotational speed, a drive pulley 202a may be selected that has a diameter that is greater than the diameter of the driven generator pulley 202b to achieve a desired fixed pulley ratio. The driveshaft 160 may be coupled to the drive pulley 202a and configured to drive the drive pulley 202a at the first rotational speed.

In one example, the power system 100 comprises an engine 114, a generator 118, a belt-driven component, and a drive system 202. The belt-driven component may be, for example, an air compressor 122 configured to output pneumatic power, a hydraulic pump 164 configured to output hydraulic power, or another belt-driven accessory. The drive system 202 comprises a drive pulley 202a, a driven generator pulley 202b, a belt-driven pulley 202c, and a driving generator pulley 202d. The power system 100 typically has an engine 114 that drives the generator 118, which is configured to convert mechanical power to electric power to power, inter alia, the power conversion circuitry 120, the welding-type power supply 148, etc.

Figure 2C:
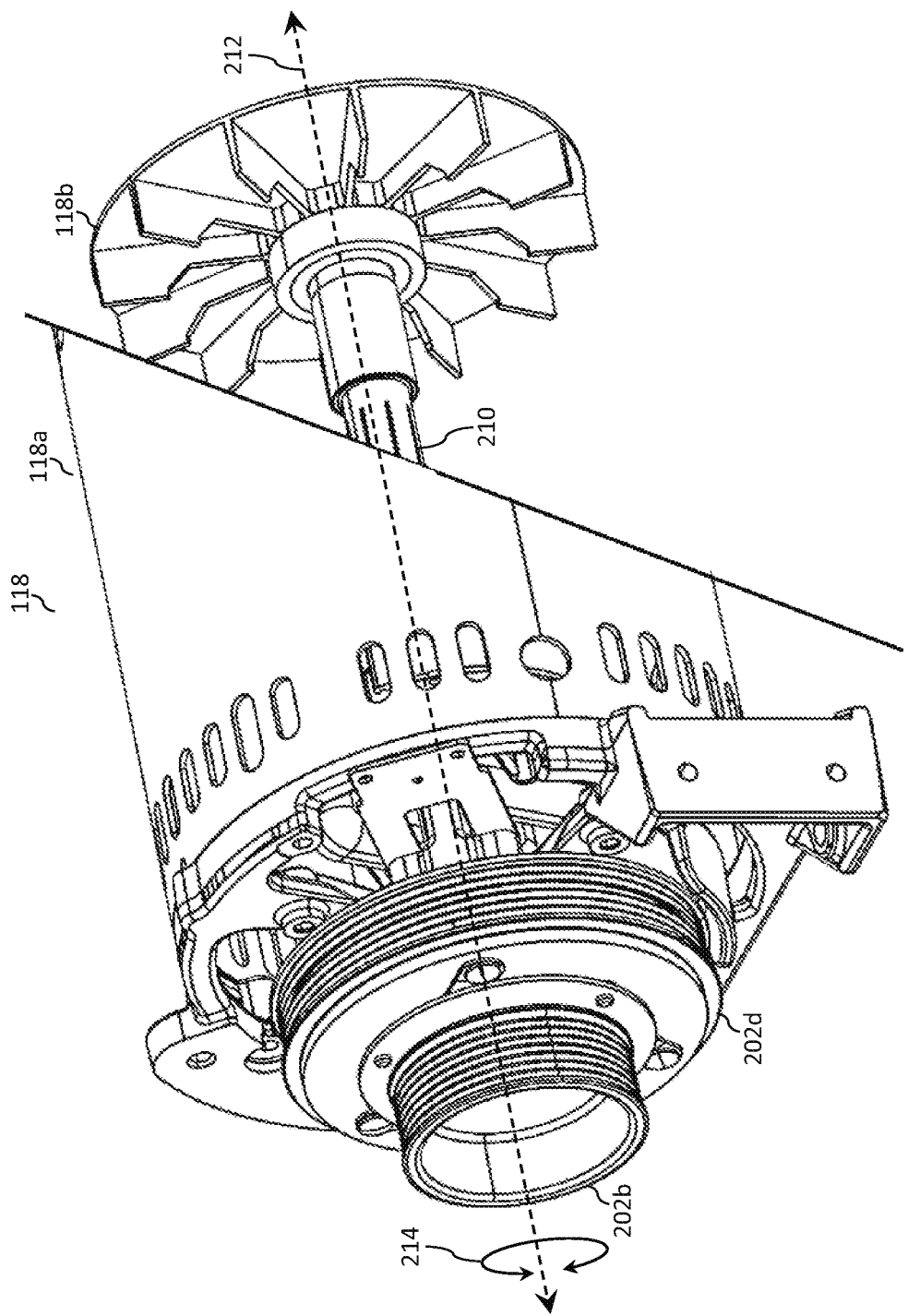
FIG. 2c illustrates a perspective cut-away view of the generator of the example power system.

FIG. 2c illustrates a cut away view of a generator 118 comprising a generator shaft 210, a stator 118a, and a rotor 118b. The various internal windings of the stator 118a and the rotor 118b are omitted from the figure for clarity. The generator 118 is configured to convert mechanical power received at the generator shaft 210 to electric power by rotating the rotor 118b relative to the stator 118a about an axis of rotation 212. The generator 118 is coupled to the driven generator pulley 202b and configured to receive the rotational force 214 via the generator shaft 210. The driven generator pulley 202b may be coupled to the generator 118 and configured to drive the generator 118.

In one example, the engine 114 is configured to output a rotational force 214 at a first rotational speed to rotate the drive pulley 202a. The driven generator pulley 202b is drivingly coupled to the drive pulley 202a via a first belt 204a. The driven generator pulley 202b is configured to rotate the generator shaft 210 at a second rotational speed based on the first rotational speed. The second rotational speed is greater than the first rotational speed. For example, the first rotational speed may be between 1,800 revolutions per minute (RPM) and 3,200 RPM, while the second rotational speed may be between 3,200 RPM and 4,000 RPM.

The driving generator pulley 202d is coupled to the generator shaft 210. The driving generator pulley 202d comprises an integrated clutch mechanism. The driving generator pulley 202d has a first diameter that is greater than a second diameter of the driven generator pulley 202b. The driving generator pulley 202d is configured to drive the belt-driven pulley 202c at a third rotational speed via a second belt 204b based on rotation of the generator shaft 210 by the driven generator pulley 202b. The belt-driven pulley 202c is configured to drive the belt-driven component. The third rotational speed may be between 4,000 RPM and 10,000 RPM. In one example, the third rotational speed may be about 9,000 RPM The driven generator pulley 202b and the driving generator pulley 202d share an axis of rotation 212. For example, the driven generator pulley 202b and the driving generator pulley 202d may be concentric. The belt-driven pulley 202c may have a third diameter that is less than the first diameter of the driving generator pulley 202d. Driving the air compressor 122 at a higher speed (e.g., the third rotational speed) allows for the compressor to be smaller and lower cost.

In some power systems, the air compressor 122 may be located next to and/or below the engine 114 to enable connection between the compressor shaft of the air compressor 122 and the engine shaft of the engine 114 via one or more belts 204a, 504b. In the illustrated power system 100, the air compressor 122 is positioned above the generator 118, which reduces the difficulty of servicing the air compressor 122, relative to conventional power systems, because the higher location in the enclosure positions the service points closer to top cover openings and/or side door openings that are generally easier to access for maintenance personnel.

Figure 3:
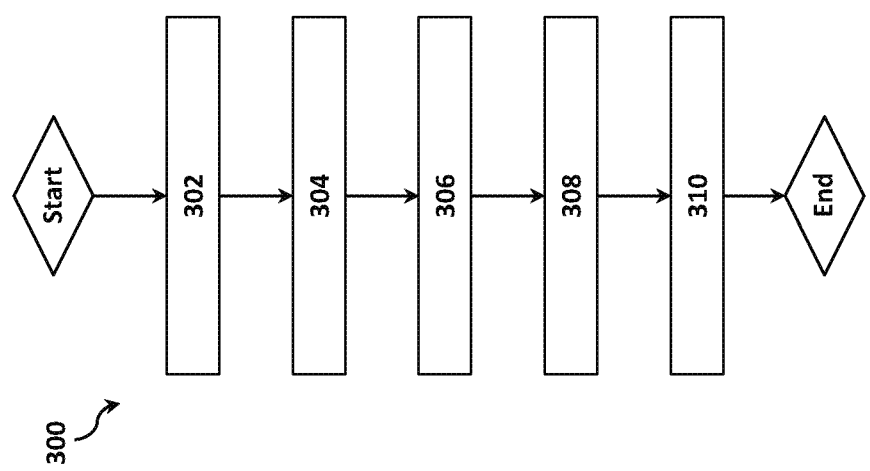
FIG. 3 is a flowchart representative of an example method for operating the example power system.

FIG. 3 illustrates an example method 300 for operating a power system 100.

At block 302, the engine 114 outputs a rotational force 214 to a drive system 202 at a first rotational speed.

At block 304, the drive system 202 converts the rotational force 214 from the first rotational speed to a second rotational speed that is greater than the first rotational speed. The drive system 202 comprises a drive pulley 202a and a driven generator pulley 202b that are drivingly coupled to one another such that the drive pulley 202a drives the driven generator pulley 202b at a fixed pulley ratio. The drive pulley 202a and the driven generator pulley 202b may be drivingly coupled to one another via a first belt 204a.

At block 306, the generator 118 receives the rotational force 214 at the second rotational speed. The generator 118 is coupled to the driven generator pulley 202b and is configured to generate electric power. The generator 118 is coupled to the driven generator pulley 202b via a generator shaft 210 and configured to receive the rotational force 214 at the second rotational speed. The generator 118 comprises a driving generator pulley 202d coupled to the generator shaft 210 that shares an axis of rotation 212 with the driven generator pulley 202b. To step up the speed, the driving generator pulley 202d has a first diameter that is greater than a second diameter of the driven generator pulley 202b.

At block 308, the belt-driven component is driven at a third rotational speed via a belt-driven pulley 202c. The belt-driven pulley 202c and the driving generator pulley 202d are drivingly coupled to one another via a second belt 204b.

At block 310, where the belt-driven component is an air compressor 122, the belt-driven component outputs pneumatic power.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A power system comprising:
a first pulley;
an engine configured to output a rotational force at a first rotational speed to rotate the first pulley;
a belt-driven component;
a generator comprising a generator shaft and configured to convert mechanical power driving the generator shaft to electric power, wherein the generator shaft operates as an intermediary between the engine and the belt-driven component;
a second pulley fixedly coupled to the generator shaft and drivingly coupled to the first pulley via a first belt, wherein the second pulley is configured to rotate the generator shaft at a second rotational speed based on the first rotational speed;
a third pulley configured to drive the belt-driven component; and
a fourth pulley fixedly coupled to the generator shaft, the fourth pulley having a first diameter that is greater than a second diameter of the second pulley, wherein the second pulley is configured to drive the fourth pulley via the generator shaft, and wherein the fourth pulley is configured to drive the third pulley at a third rotational speed via a second belt, wherein the fourth pulley comprises an integrated clutch mechanism.

2. The power system of claim 1, wherein the belt-driven component is an air compressor configured to output pneumatic power.

3. The power system of claim 1, wherein the second rotational speed is greater than the first rotational speed.

4. The power system of claim 3, wherein the third rotational speed is greater than the second rotational speed.

5. The power system of claim 1, wherein the first rotational speed is between 1,800 revolutions per minute (RPM) and 3,200 RPM.

6. The power system of claim 5, wherein the second rotational speed is between 3,200 RPM and 4,000 RPM.

7. The power system of claim 6, wherein the third rotational speed is between 4,000 RPM and 10,000 RPM.

8. The power system of claim 1, further comprising a welding-type power supply that is configured to receive electric power from the generator.

9. The power system of claim 1, wherein the second pulley and the fourth pulley share an axis of rotation.

10. The power system of claim 9, wherein the third pulley has a third diameter that is less than the first diameter.

11. A method for operating a power system, the method comprising:
outputting, via an engine, a rotational force to a drive system at a first rotational speed;
converting the rotational force from the first rotational speed to a second rotational speed that is greater than the first rotational speed via the drive system,
wherein the drive system comprises a drive pulley and a driven generator pulley that are drivingly coupled to one another such that the drive pulley drives the driven generator pulley at a fixed pulley ratio; and
receiving, at a generator configured to generate electric power, the rotational force at the second rotational speed, wherein the generator is coupled to the driven generator pulley;
wherein the generator is fixedly coupled to the driven generator pulley via a generator shaft and configured to receive the rotational force at the second rotational speed,
wherein the generator comprises a driving generator pulley fixedly coupled to the generator shaft that shares an axis of rotation with the driven generator pulley,
wherein the driving generator pulley comprises an integrated clutch mechanism, and
wherein the driving generator pulley has a first diameter that is greater than a second diameter of the driven generator pulley; and
driving a belt-driven component at a third rotational speed via a belt-driven pulley driven by the generator shaft,
wherein the driving generator pulley and the belt-driven pulley are drivingly coupled to one another via a second belt, and
wherein the driven generator pulley is configured to drive the driving generator pulley via the generator shaft such that the generator shaft operates as an intermediary between the engine and the belt-driven component.

12. The method of claim 11, wherein the belt-driven component is an air compressor, the method further comprising the step of outputting pneumatic power.

13. The method of claim 11, wherein the second rotational speed is greater than the first rotational speed.

14. The method of claim 13, wherein the third rotational speed is greater than the second rotational speed.

15. The method of claim 11, wherein the first rotational speed is between 1,800 revolutions per minute (RPM) and 3,200 RPM.

16. The method of claim 15, wherein the second rotational speed is between 3,200 RPM and 4,000 RPM.

17. The method of claim 16, wherein the third rotational speed is between 4,000 RPM and 10,000 RPM.

18. A generator for an engine-driven power system, the generator comprising:
- a generator shaft configured to rotate a rotor that is arranged to rotate relative to a stator, wherein the generator shaft operates as an intermediary between an engine and the belt-driven component;
- a driven pulley fixedly coupled to the generator shaft,
  wherein the driven pulley is configured to receive a rotational force at a first rotational speed from the engine via a first belt; and
- a driving generator pulley fixedly coupled to and driven by the generator shaft,
  wherein the driving generator pulley comprises an integrated clutch mechanism and has a first diameter that is greater than a second diameter of the driven pulley, and
  wherein the driven pulley is configured to transfer the rotational force to the belt-driven component via a second belt to drive the belt-driven component at a second rotational speed; and
- a belt-driven pulley coupled to the belt-driven component,
  wherein the belt-driven component is configured to receive the rotational force at a third rotational speed,
  wherein the driving generator pulley and the belt-driven pulley are drivingly coupled to one another via a second belt, and
  wherein the generator shaft is configured to operate an intermediary between the engine and the belt-driven component.

19. The generator of claim 18, wherein the second rotational speed is greater than the first rotational speed.

20. The generator of claim 19, wherein the first rotational speed is between 3,200 RPM and 4,000 RPM.

21. The generator of claim 18, wherein the belt-driven component is an air compressor.

* * * * *